(No Model.)

J. E. POWER.
BICYCLE TENDER.

No. 566,535. Patented Aug. 25, 1896.

WITNESSES:
John Buckler
C. Gash

INVENTOR
James E. Power,
BY
Edgar Tate
ATTORNEYS.

UNITED STATES PATENT OFFICE.

JAMES E. POWER, OF BROOKLYN, NEW YORK.

BICYCLE-TENDER.

SPECIFICATION forming part of Letters Patent No. 566,535, dated August 25, 1896.

Application filed December 2, 1895. Serial No. 570,730. (No model.)

*To all whom it may concern:*

Be it known that I, JAMES E. POWER, a citizen of the United States, and a resident of Brooklyn, in the county of Kings and State of New York, have invented certain new and useful Improvements in Bicycle-Tenders, of which the following is a specification, reference being had to the accompanying drawings, forming a part thereof, in which similar letters of reference indicate corresponding parts.

This invention relates to bicycles and similar vehicles, and the object thereof is to provide a tender therefor, consisting of a supplemental truck on which is mounted a box or body which is designed to receive articles of various kinds and classes, and which is suitably geared to or connected with the bicycle or other vehicle in such manner as to be easily conveyed thereby from one point to another, a further object being to provide a device of this class which is adapted for use in the delivery of small articles of merchandise or for collecting and distributing mail and for many other and similar purposes.

The invention is fully disclosed in the following specification, of which the accompanying drawings form a part, in which—

Figure 1:
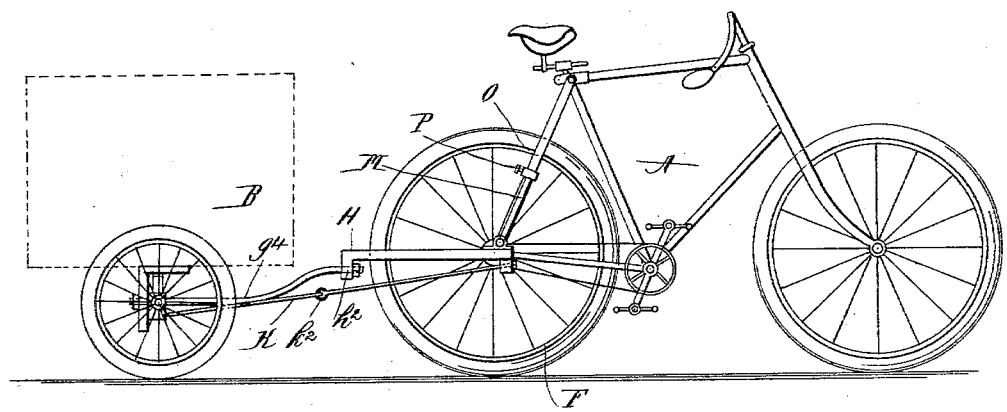
Figure 2:
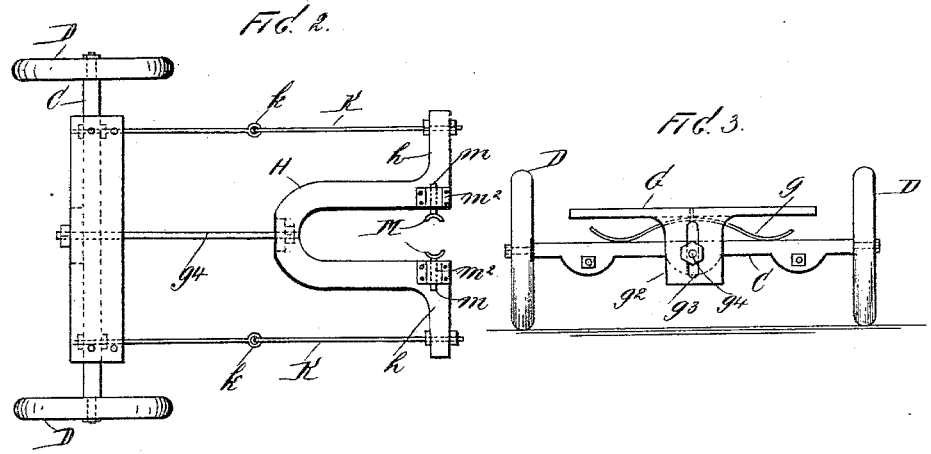
Figure 3:
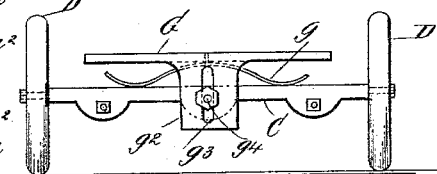

Figure 1 is a side view of my improved bicycle-tender, showing the same connected with a bicycle and ready for use; Fig. 2, a plan view of the tender, or the running-gears thereof, with the box or body removed; and Fig. 3, an end view thereof.

In the drawings forming part of this application, A represents an ordinary bicycle, and B my improved tender. The tender B comprises a truck consisting of an axle C, wheels D, which are preferably similar to ordinary bicycle-wheels, but of less diameter, and the axle C is provided with a bolster G, which is supported by means of a spring or springs $g$, on which it rests, and the ends of which bear upon the axle. The bolster G is also provided with a depending central portion $d^2$, having a vertical slot $g^3$, through which passes a rod $g^4$, which also passes through the axle, and by means of which the bolster G is capable of vertical movement, and is thus spring-supported, as will be readily understood.

The truck is connected with that part of the frame of the bicycle with which the drive-wheel F is connected by means of a yoke H, having side arms $h$, which project outwardly from the ends of the sides of said yoke, and the yoke H is connected with the axle of the truck by means of the rod $g^4$, which passes through said axle, as hereinbefore described, and the forward end of which is upwardly curved and passes through a depending shoulder $h^2$, formed on said yoke, or the outer end thereof, as clearly shown in Figs. 1 and 2, and the outer ends of the arms $h$ of the yoke H are also connected with the axle C of the truck by means of side rods K, which are formed in sections, which are pivotally connected or hinged at $k$.

The yoke H is adapted to inclose or to surround the drive-wheel or a portion thereof, and the ends of said yoke are connected with the frame of the machine by means of vertical rods M, which are segmental in cross-section, and the concave sides of which are directed toward the fork O of the frame of the bicycle, which extends from the axle of the drive-wheel upward in the direction of the seat. The rods M are provided at their lower ends with outwardly-directed arms $m$, which pass through keepers or bearings $m^2$, secured to the yoke H, and the upper ends of said arms are provided with clamps P, of any desired form of construction, by means of which they are secured to the fork O, and by means of this arrangement it will be seen that the connection between the forward end of the yoke H and the bicycle-frame is a pivotal or hinged connection, the clamps P being preferably so constructed as to permit of a slight movement of the rods or bars M, and said rods or bars M being pivotally connected with the yoke H by means of the arms $m$ at the lower end thereof.

The operation will be readily understood from the foregoing description, when taken in connection with the accompanying drawings, and does not need further description; but it will be readily understood that the bicycle A may be of any preferred form of construction, and that by means thereof the tender B may be easily conveyed from one point to another, and is well adapted to serve as a means for delivering light articles of merchandise and for gathering or distributing mail-matter and for various other and similar purposes.

Having fully described my invention, I claim and desire to secure by Letters Patent—

1. The combination with a bicycle, of a tender connected with the rear part of the frame thereof, said tender comprising a truck provided with wheels and a body or box portion mounted thereon, and said tender being connected with the bicycle by means of a yoke having side arms which project outwardly from the ends of the sides of said yoke and said yoke being connected with the axle of the truck of the tender, substantially as shown and described.

2. The combination with a bicycle, of a tender connected therewith comprising a truck, a spring-supported box or body mounted thereon, and means for connecting said truck with the bicycle, comprising a yoke which is connected with said truck and the side arms of which are extended forward adjacent to the axle of the drive-wheel, and connected with the frame of the vehicle by means of vertical rods or bars which are pivotally connected with the yoke and the upper ends of which are connected by means of clamps or other devices with the fork of the drive-wheel, substantially as shown and described.

3. The combination with a bicycle, of a tender connected therewith comprising a truck, a spring-supported box or body mounted thereon, and means for connecting said truck with the bicycle, comprising a yoke which is connected with said truck and the side arms of which are extended forward adjacent to the axle of the drive-wheel, and connected with the frame of the vehicle by means of vertical rods or bars, which are pivotally connected by means of clamps or other devices with the fork of the drive-wheel, and said yoke being provided with side arms which are connected with the truck by means of rods which are formed in sections or pivotally united or hinged near their centers, and a central rod which is also connected with the axle of the truck and with the rear end of the yoke, substantially as shown and described.

In testimony that I claim the foregoing as my invention I have signed my name, in presence of the subscribing witnesses, this 27th day of November, 1895.

JAMES E. POWER.

Witnesses:
T. J. JONES,
THOMAS E. CHRYSTAL.